United States Patent [19]

Sogo et al.

[11] Patent Number: 5,568,517
[45] Date of Patent: Oct. 22, 1996

[54] DECODING DEVICE FOR PERFORMING AMPLITUDE-PHASE DEMODULATION AND VITERBI DECODING

[75] Inventors: Akira Sogo; Ryo Kamiya, both of Hamamatsu, Japan

[73] Assignee: Yamaha Corporation, Hamamatsu, Japan

[21] Appl. No.: 433,137

[22] Filed: May 4, 1995

Related U.S. Application Data

[62] Division of Ser. No. 175,266, Dec. 29, 1993, Pat. No. 5,436,932.

[30] Foreign Application Priority Data

Jan. 5, 1993 [JP] Japan ................................ 5-015968

[51] Int. Cl.$^6$ ............................ H04L 5/12; H04L 23/02
[52] U.S. Cl. ............................................................ 375/262
[58] Field of Search .................................... 375/261, 262, 375/265, 340, 341, 268, 269, 322, 324; 371/43

[56] References Cited

U.S. PATENT DOCUMENTS 5,301,209  4/1994  Wei ........................................... 375/39

Primary Examiner—Stephen Chin
Assistant Examiner—Hai H. Phan
Attorney, Agent, or Firm—Loeb & Loeb LLP

[57] ABSTRACT

A modulator-demodulator (i.e., modem) permits a personal computer and the like to receive and transmit data in digital format across voice-oriented communications links such as telephone lines. A full-duplex-type modem employs a decoding device decoding the data which are subjected to convolution-encoding operation and amplitude-phase modulation. That data is subjected to amplitude-phase demodulation at first: and then, it is subjected to viterbi decoding by which an error correction is carried out. In the amplitude-phase demodulation, an amplitude-phase plane is employed and is divided into a plurality of areas in accordance with an arrangement of signal-placing points which is used by the amplitude-phase modulation. When receiving the data, a certain receiving point is defined. Then, one of the areas to which the receiving point belongs is determined; and its area information is produced. A plurality of candidate paths are determined by referring to the signal-placing points which are arranged around the area to which the receiving point belongs. A distance between the receiving point and each signal-placing point is computed with respect to each of the candidate paths, thus eventually determining a surviving path whose total distance is the smallest. On the basis of the surviving path, a viterbi decoding is performed to determine low-order bits for decoded data. A random-access memory temporarily stores and retains the area information during a predetermined period of time, so that old area information is currently read out. Based on the old area information, high-order bits for the decoded data are determined in accordance with a predetermined algorithm.

16 Claims, 17 Drawing Sheets

| SAMPLING MOMENT<br>RECEIVING POINT | T₁<br>① | T₂<br>② | T₃<br>③ | T₄<br>④ |
|---|---|---|---|---|
| AREA NUMBER | 00100010 | 00100110 | 00110101 | 11011101 |
| 000 | 1.5 | 1.6 | 0.9 | 1.0 |
| 001 | 0.5 | 0.9 | 2.3 | 2.0 |
| 010 | 1.5 | 1.8 | 2.0 | 1.9 |
| 011 | 1.7 | 1.5 | 1.7 | 0.6 |
| 100 | 0.9 | 0.5 | 1.5 | 1.2 |
| 101 | 1.7 | 1.5 | 1.7 | 2.3 |
| 110 | 2.0 | 2.3 | 1.5 | 1.9 |
| 111 | 2.3 | 1.9 | 0.5 | 1.4 |
| | DISTANCE rnk | | | |

○ --- RECEIVING POINT
● --- SIGNAL-PLACING POINT
⊙ --- CANDIDATE PATH $(Y_{2n}, Y_{1n}, Y_{0n})=(1,0,0)$ $(Y_{2n}, Y_{1n}Y_{0n})=(1,0,1)$ $(Y_{2n}, Y_{1n}, Y_{0n})=(1,1,0)$ $(Y_{2n}, Y_{1n}Y_{0n})=(1,1,1)$

PRIOR ART

○ --- RECEIVING POINT
● --- SIGNAL-PLACING POINT
⊙ --- CANDIDATE PATH

DECODING DEVICE FOR PERFORMING AMPLITUDE-PHASE DEMODULATION AND VITERBI DECODING

This is a divisional of application Ser. No. 08/175,266, filed Dec. 29, 1993, now U.S. Pat. No. 5,436,932.

BACKGROUND OF THE INVENTION

1. Field of the Invention

The present invention relates to a decoding device which is used in a full-duplex-type modem (i.e., a modulator-demodulator utilizing a full-duplex data transmission).

2. Related Art

Conventionally, the full-duplex-type modems employ a known encoding-decoding method utilizing a combination of a convolution-encoding device and a quadrature amplitude-phase modulator. As the convolution-encoding device, a trellis encoder is known. Hereinafter, the operations of the above-mentioned encoding-decoding method will be described by referring to V.32 bis standard from the recommendations of the CCITT (i.e., Comite Consultatif Internationale de Telegraphique et Telephonique; an international body that develops communications standards).

According to this method, serial data to be transferred at speed of 14400 Bps (where "Bps" represents a unit called bits per second) are divided into a plurality of unit data each consisting of six bits. Each 6-bit data within those unit data is converted into 7-bit data by the encoding operation performed by the trellis encoder. At a certain sampling moment "n", certain 6-bit data consisting of six bits called Q6n, Q5n . . . , Q1n is converted into certain 7-bit data consisting of seven bits called Y6n, Y5n . . . , Y0n, for example. In this case, the trellis encoder directly uses high-order four bits Q6n to Q3n in the 6-bit data as high-order four bits Y6n to Y3n in the 7-bit data to be outputted. On the other hand, low-order two bits Q2n and Q1n are supplied to a differential encoder, from which two bits Y2n and Y1n are obtained. Based on those bits Y2n and Y1n, the trellis encoder determines a least significant bit Y0n in accordance with a certain state transition rule as shown in FIG. 13. This bit Y0n is added to the six bits Y6n to Y1n as a redundant bit.

Then, the 7-bit data consisting of the bits Y6n to Y0n are subjected to quadrature amplitude modulation called "QAM". FIG. 14 shows a signal space diagram having signal-placing points each indicative of each of digital signals in an amplitude-phase plane before performing the modulation.

In a receiving modem, signals transmitted from a sending modem are subjected to QAM decoding, thus obtaining coordinate information (Xnr, Ynr), regarding a receiving point, on the amplitude-phase plane. The coordinate information is supplied to a decoding system as shown in FIG. 15. At first, an area comparison portion 1 performs an area comparison based on the coordinates Xnr, Ynr on the amplitude-phase plane. This example uses eight kinds of area comparisons as shown in FIGS. 16(A) to 16(D) and FIGS. 17(A) to 17(D) so as to obtain a candidate path for each of eight sets of low-order three bits Y2n, Y1n and Y0n: (000), (001) . . . , (111). A candidate-path-coordinate determining portion 2 shown in FIG. 15 determines eight sets of coordinates for the candidate paths. Then, a distance computing portion 3 computes a distance between a point defined by the coordinates of each candidate path and another point defined by the coordinates Xnr, Ynr. In accordance with the state transition rule as shown In FIG. 13, a viterbi decoder 4 works to select one of the candidate paths as a surviving path which has the smallest sum of the distances between the points. For example, in order to obtain the surviving path with respect to twelve stages (or twelve sampling periods), the viterbi decoder 4 firstly chooses the paths each of which can lead a searching route from each of states, denoted by "S000", "S001", . . . , "S111" shown in FIG. 13, to a desired state after passing through twelve stages; and then, the viterbi decoder 4 finally selects the shortest path among the chosen paths. At a time when the surviving path is obtained, previous receiving data, which has been supplied at a previous timing which is the twelve sampling moments before the current sampling moment, is defined.

In the conventional decoding device as described above, when one receiving point is given, the area comparisons as shown in FIGS. 16(A) to 17(D) should be performed plural times so as to determine a plurality of candidate paths. In other words, the conventional decoding device requires complicated area-comparison/judgement processes, which raises a drawback that a relatively long time should be required.

Moreover, when performing the viterbi decoding, the high-order four bits to be coupled with the low-order three bits must be stored with respect to each of the states. Further, those data required for each state should be memorized with respect to each of twelve stages If the twelve stages are required for determining the surviving path. In such case, a random-access memory (i.e., RAM) 5 must store a large amount of data, the number of which corresponds to 4 (bits)×8 (states)×12 (stages). This requires a large storage capacity for the RAM 5.

SUMMARY OF THE INVENTION

Accordingly, it is an object of the present invention to provide a decoding device which is capable of performing decoding operations with simplified comparison/judgement processes and with a reduced storage capacity.

According to the present invention, a decoding device is fundamentally designed to receive the data which has been subjected to convolution-encoding operation and amplitude-phase modulation; and then, the decoding device performs a viterbi decoding after performing an amplitude-phase demodulation on the receiving data. The decoding device comprises an area determining portion, a candidate-path determining portion, a distance computing portion, a viterbi decoder portion, a storage portion and a high-order-bit determining portion. Herein, a whole area of the amplitude-phase plane used by the amplitude-phase demodulation is divided into a plurality of areas each having a pitch which is smaller than a pitch formed between two signal-placing points. A plurality of signal-placing points are arranged in advance on the amplitude-phase plane when performing the amplitude-phase modulation. The area determining portion determines which area in the amplitude-phase plane a receiving point corresponding to the receiving data belongs to. Then, the area determining portion creates area information representing the area to which the receiving point belongs. A plurality of signal-placing points are determined in advance with respect to each area to which the receiving point may belong. Some of them are combined to form a candidate path. Thus, a plurality of candidate paths are automatically determined when the area to which the receiving point belongs is determined. The candidate-path determining portion determines those candidate paths on the basis of the area information. The distance computing portion computes a distance between the receiving point and the signal-placing point corresponding to each candidate path; thus, the distance computing portion computes a plurality of distances with respect to a plurality of candidate paths. The above computation is carried out at each of sampling moments; thus, each candidate path has a total distance when the computation is carried out plural times during plural sampling moments. The viterbi decoder portion performs a viterbi decoding on the candidate paths on the basis of their distances computed, thus determining a surviving path whose total distance is the smallest during a predetermined number of sampling moments. The viterbi decoder portion also determines low-order bits for decoded data with respect to a previous receiving point which has been emerged at a previous timing which is the predetermined number of sampling moments before a current sampling moment. The storage portion retains the area information during a certain period of time corresponding to the predetermined number of sampling moments. Thus, the storage portion outputs a previous area information which has been determined by the area determining portion at the previous timing which is the predetermined number of sampling moments before the current sampling moment. On the basis of the previous area information and the low-order bits corresponding to the previous receiving point, the high-order-bit determining portion determines high-order bits for the decoded data in response to a combination of the signal-placing points which is determined in advance with respect to each area to which the receiving point may belong.

According to the present invention, when determining the area to which the receiving point belongs, the area determining portion outputs the area information, by which a plurality of candidate paths are specifically defined. Thus, a number of times by which the area-comparison/judgement process is carried out can be reduced to one.

Since the predetermined candidate paths are simply defined by the area information, the high-order bits for the decoded data can be determined on the basis of the area information and the low-order bits which are obtained by performing the viterbi decoding. Thus, when performing the viterbi decoding, it is not necessary to store the high-order bits with respect to each state of each sampling moment. Instead, the area information corresponding to the receiving point is merely stored for each sampling moment. The storage portion should have a storage capacity which can store a plenty of information concerning the candidate paths until the surviving path is determined. However, the present invention can reduce the storage capacity required for the storage portion.

BRIEF DESCRIPTION OF THE DRAWINGS

Further objects and advantages of the present invention will be apparent from the following description, reference being had to the accompanying drawings wherein the preferred embodiment of the present invention is clearly shown.

In the drawings:

FIG. 9 shows a relationship between each receiving point and distances for the candidate paths;

FIGS. 16(A) to 6(D) show several kinds of methods of the area comparison; and

FIGS. 17(A) to 7(D) show other methods of the area comparison.

DESCRIPTION OF THE PREFERRED EMBODIMENT

Next, a data sending/receiving system, which is designed in accordance with the aforementioned V.32bis standard from the recommendations of the CCITT, will be described in detail.

Figure 1:
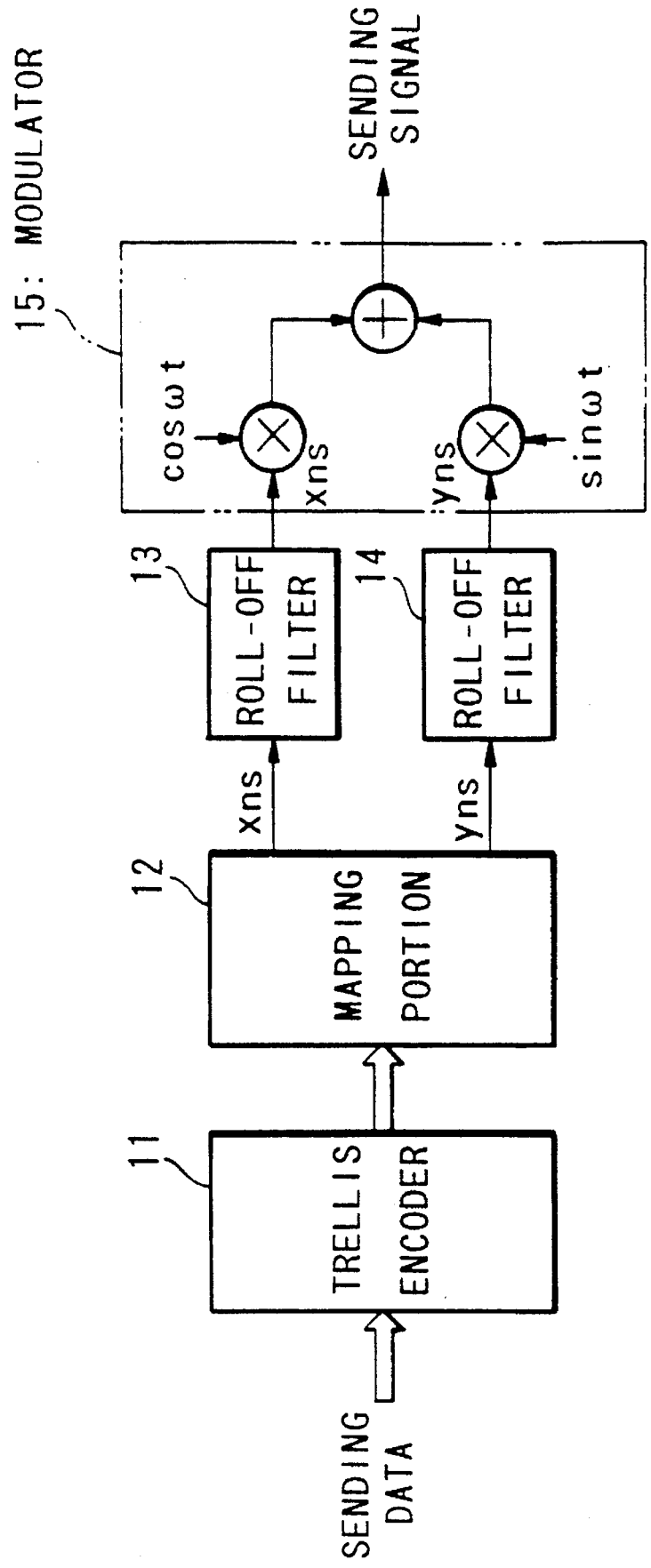
FIG. 1 is a block diagram showing a data sending system.
Figure 2:
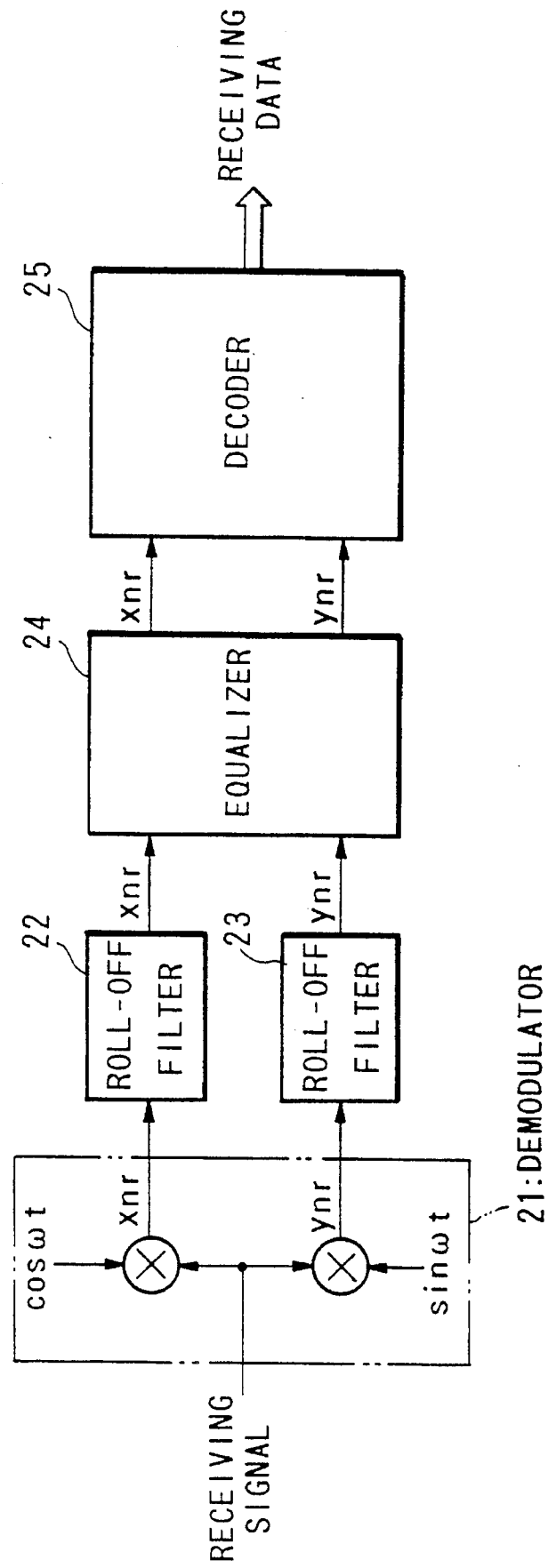
FIG. 2 is a block diagram showing a data receiving system employing a decoder according to the present invention.

FIGS. 1 and 2 are block diagrams which show a whole electronic configuration of the data sending/receiving system, wherein FIG. 1 shows a data sending system, while FIG. 2 shows a data receiving system.

In FIG. 1, each sending data is subjected to encoding operation in a trellis encoder 11; and then, encoded data is placed at a specific signal-placing point on the amplitude-phase plane by a mapping portion 12. Roll-off filters 13 and 14 respectively shape quadrature components (i.e., Xns, Yns), which are then modulated by a modulator 15. Thus, a sending signal is outputted from the modulator 15. On the other hand, in the data receiving system shown in FIG. 2, a receiving signal is demodulated by a demodulator 21; and then, demodulated data (i.e., Xnr, Ynr ) are subjected to equalization by roll-off filters 22, 23 and a equalizer 24. Thereafter, output data of the equalizer 24 are decoded by a decoder 25.

Figure 3:
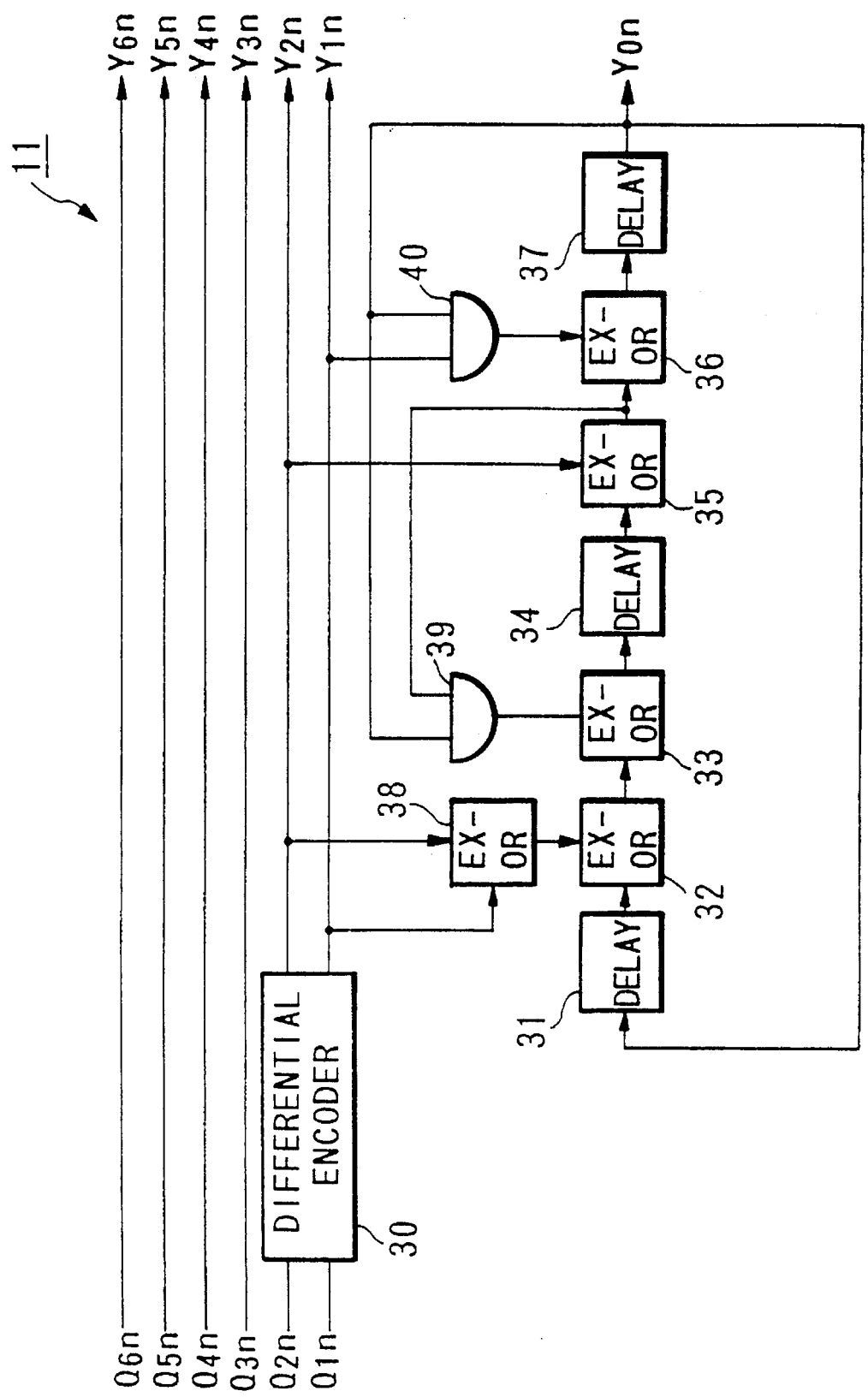
FIG. 3 is a block diagram showing a detailed configuration of a trellis encoder shown in FIG. 1.

FIG. 3 is a block diagram showing a detailed configuration of the trellis encoder 11 which is provided in the data sending system shown in FIG. 1.

Figure 8:
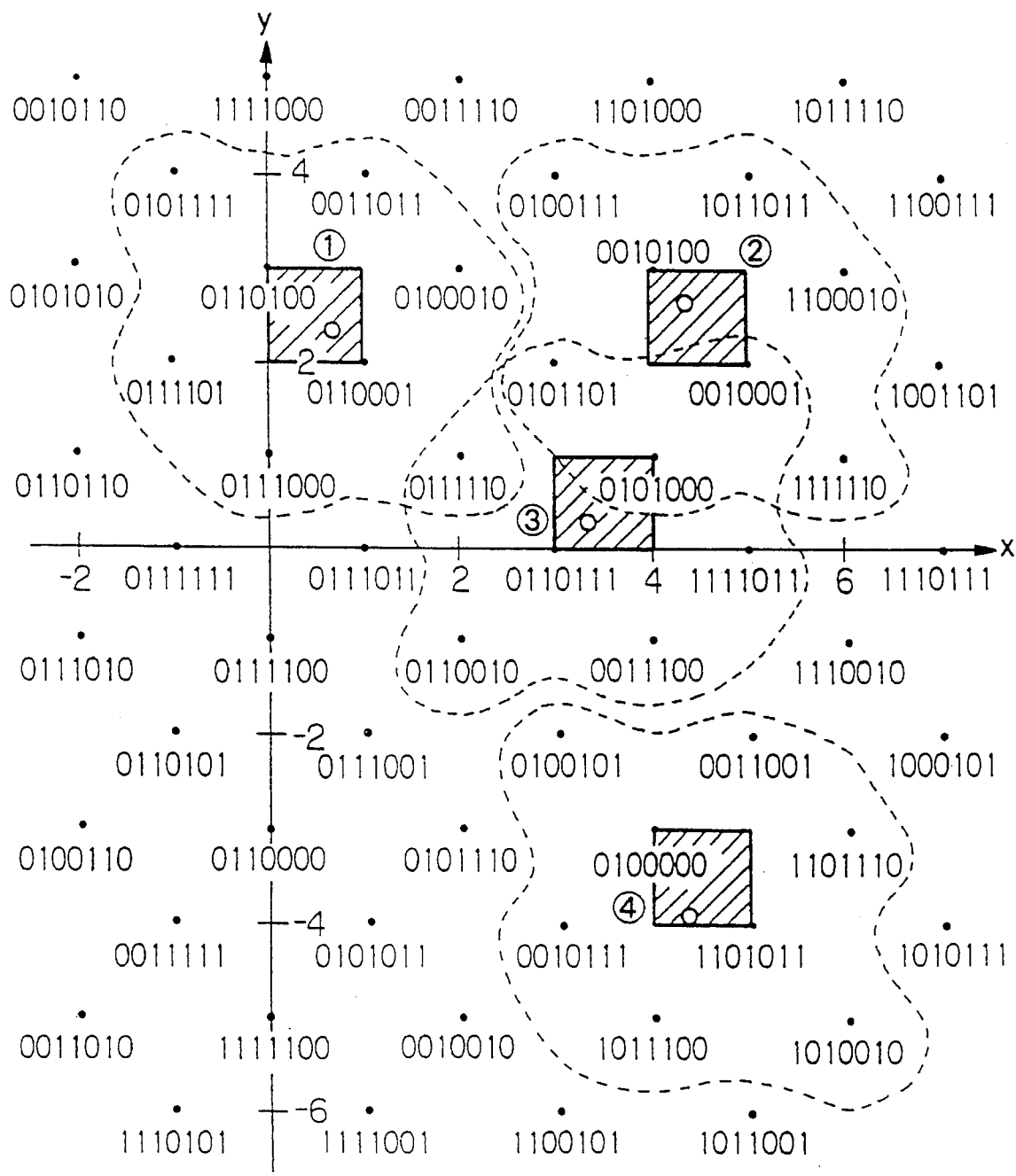
FIG. 8 shows a relationship between each receiving point, its area and candidate paths.

In FIG. 8, the Sending data are Inputted into the trellis encoder 11 by each unit data of six bits; and then, such 6-bit data is added with one redundant bit so that the 6-bit data is eventually converted into the 7-bit data. In this case, the four bits Q6n to Q6n which are inputted into the trellis encoder 11 at the certain sampling moment "n" are directly used as the high-order four bits Y6n to Y3n to be outputted. In addition, the low-order two bits Q2n and Q1n within the 6-bit data inputted into the trellis encoder 11 are supplied to a differential encoder 30, from which two bits Y2n and Y1n are obtained. Those two bits Y2n and Y1n are also used for producing the redundant bit Y0n. A one-sample delay circuit 31, exclusive-OR circuits 32, 33, a one-sample delay circuit 34, exclusive-OR circuits 35, 36 and a one-sample delay circuit 87 are connected in series in a cascade manner. Herein, an output of the one-sample delay circuit 37 is fed bask to the one-sample delay circuit 31. The two bits Y2n and Y1n outputted from the differential encoder 30 are supplied to an exclusive-OR circuit 38, an output of which is then supplied to a first input of the exclusive-OR circuit 32. Incidentally, an output of the one-sample delay circuit 31 is supplied to a second input of the exclusive-OR circuit 32. An AND gate 39 receives an output of the delay circuit 37 and an output of the exclusive-OR circuit 35. Thus, the AND gate 39 performs an AND operation on them so as to produce a logical product, which is then supplied to a first input of the exclusive-OR circuit 33. Incidentally, an output of the exclusive-OR circuit 32 is supplied to a second input of the exclusive-OR circuit 33. The bit Y2n is supplied to a first input of the exclusive-OR circuit 35, while an output of the delay circuit 34 is supplied to a second input of the exclusive-OR circuit 35. The bit Y1n and the output of the delay circuit 37 are supplied to an AND gate 40, which produces a logical product to be supplied to a first input of the exclusive-0R circuit 36. Incidentally, an output of the exclusive-OR circuit 35 is supplied to a second input of the exclusive-OR circuit 36.

Figure 13:
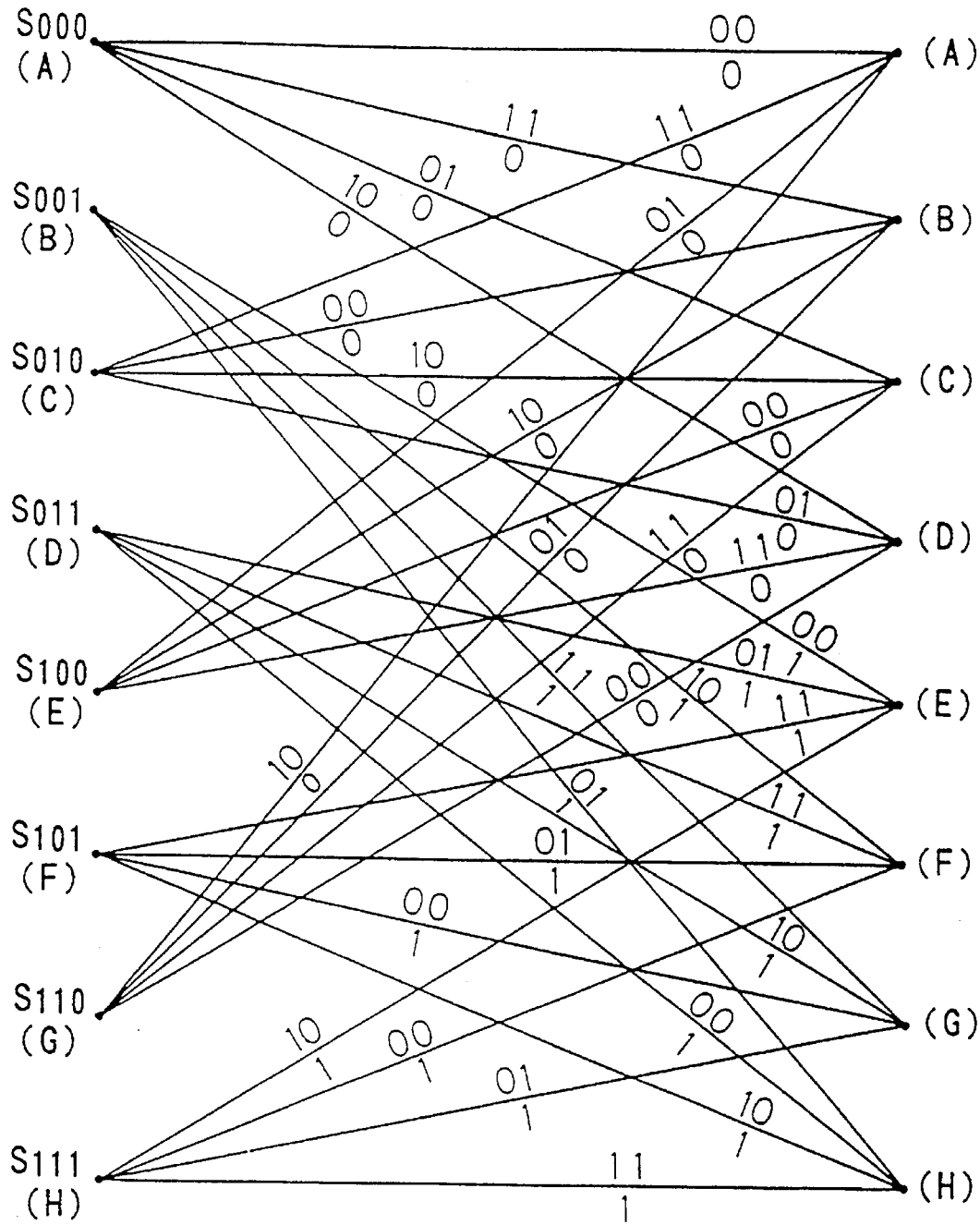
FIG. 13 shows a state transition manner which is employed by the trellis encoder.

In the trellis encoder 11 having the configuration as shown in FIG. 3, convolution operations using the two bits Y2n and Y1n outputted from the differential encoder 30 are performed so as to produce the redundant bit Y0n, the value of which is determined in accordance with the state transition rule as shown in FIG. 13. Symbols D0, D1 and D2 used in each state S[D0] [D1] [D2] shown in FIG. 13 indicate three data respectively retained in the delay circuits 31, 34 and 37 shown in FIG. 3. In the state transition diagram shown in FIG. 13, two digits written above each line indicate the two bits Y2n and Y1n, while one digit written below each line indicates the bit Y0n.

Figure 14:
FIG. 14 is a signal space diagram having the signal-placing points which are arranged on the amplitude-phase plane in accordance with the V.32bis standard.
Figure 15:
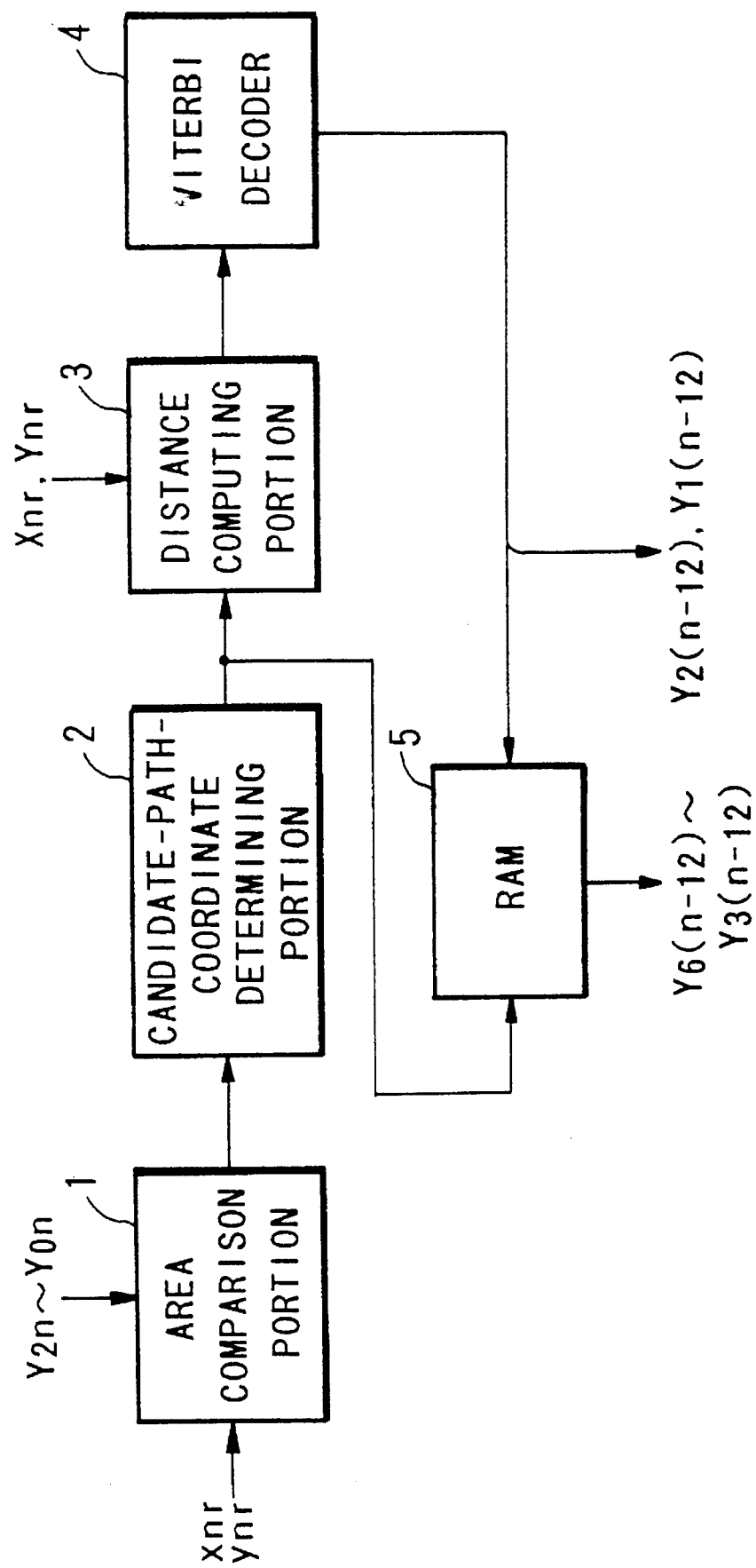
FIG. 15 is a block diagram showing an example of the decoding system conventionally used.
Figure 16:
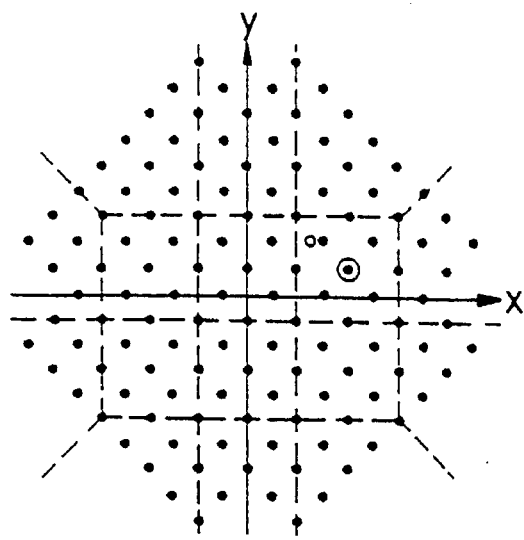
Figure 16:
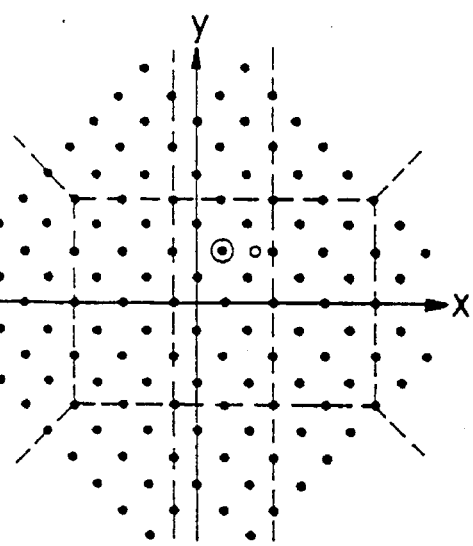
Figure 16:
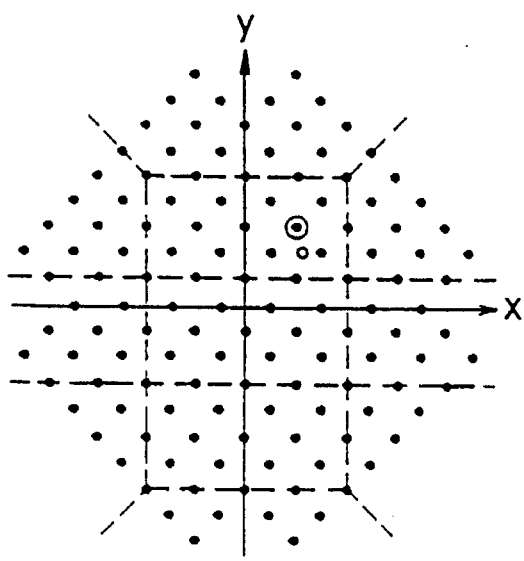
Figure 16:
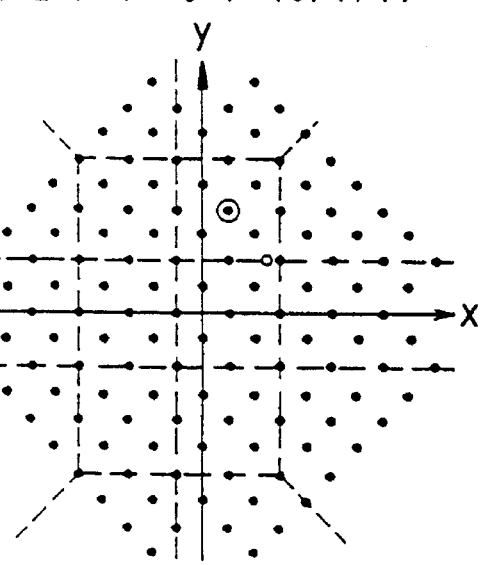
Figure 17A:
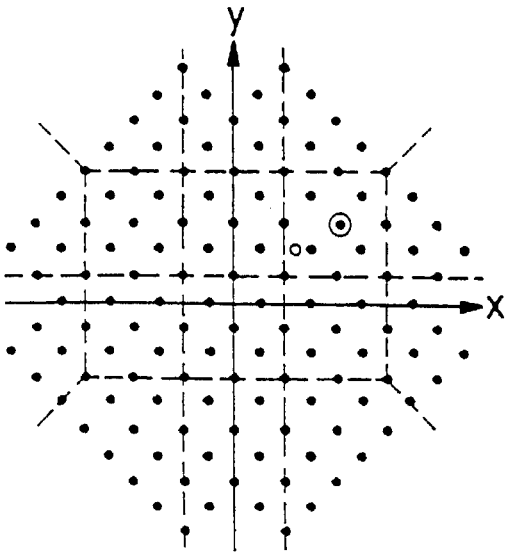
Figure 17B:
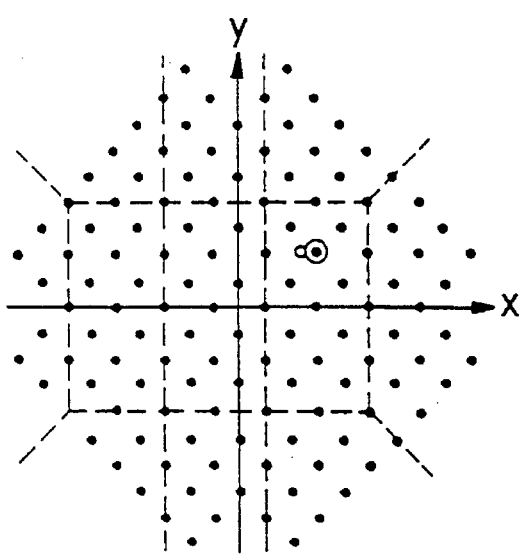
Figure 17C:
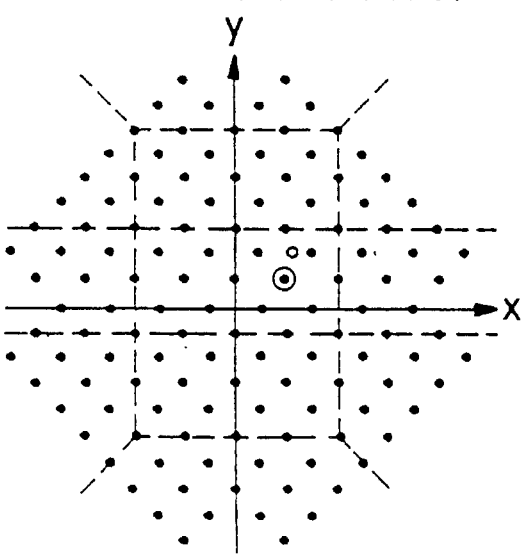
Figure 17D:
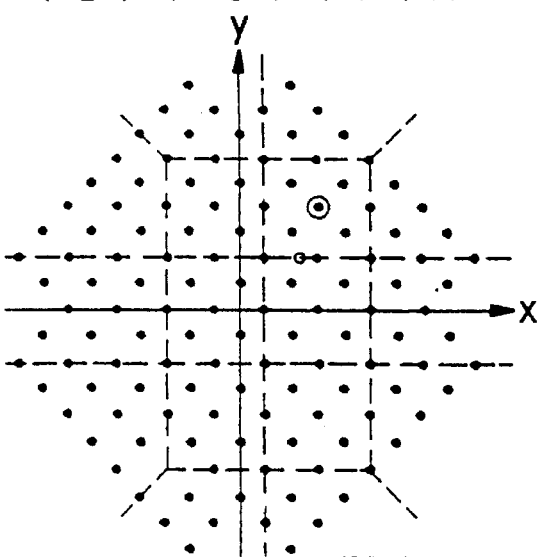

Next, on the basis of the 7-bit data, consisting of the seven bits Y6n to Y0n, outputted from the trellis encoder 11, the mapping portion 12 produces values representing the coordinates Xns, Yns which indicate a certain signal-placing point on the amplitude-phase plane shown in FIG. 14. On the basis of those coordinates Xns and Yns, the sending signal, which is modulated from the sending data by the modulator 15, is transmitted on a transmission line. Incidentally, each 7-bit data written with respect to each signal-placing point in FIG. 14 consists of the seven bits Y6n, Y5n ..., Y0n.

In the data receiving system shown in FIG. 2, the receiving signal is decoded to the receiving data; and then, the coordinates Xnr and Ynr are obtained from the receiving data. Based on the coordinates Xnr and Ynr, a predetermined decoding operation is performed by the decoder 25.

Figure 4:
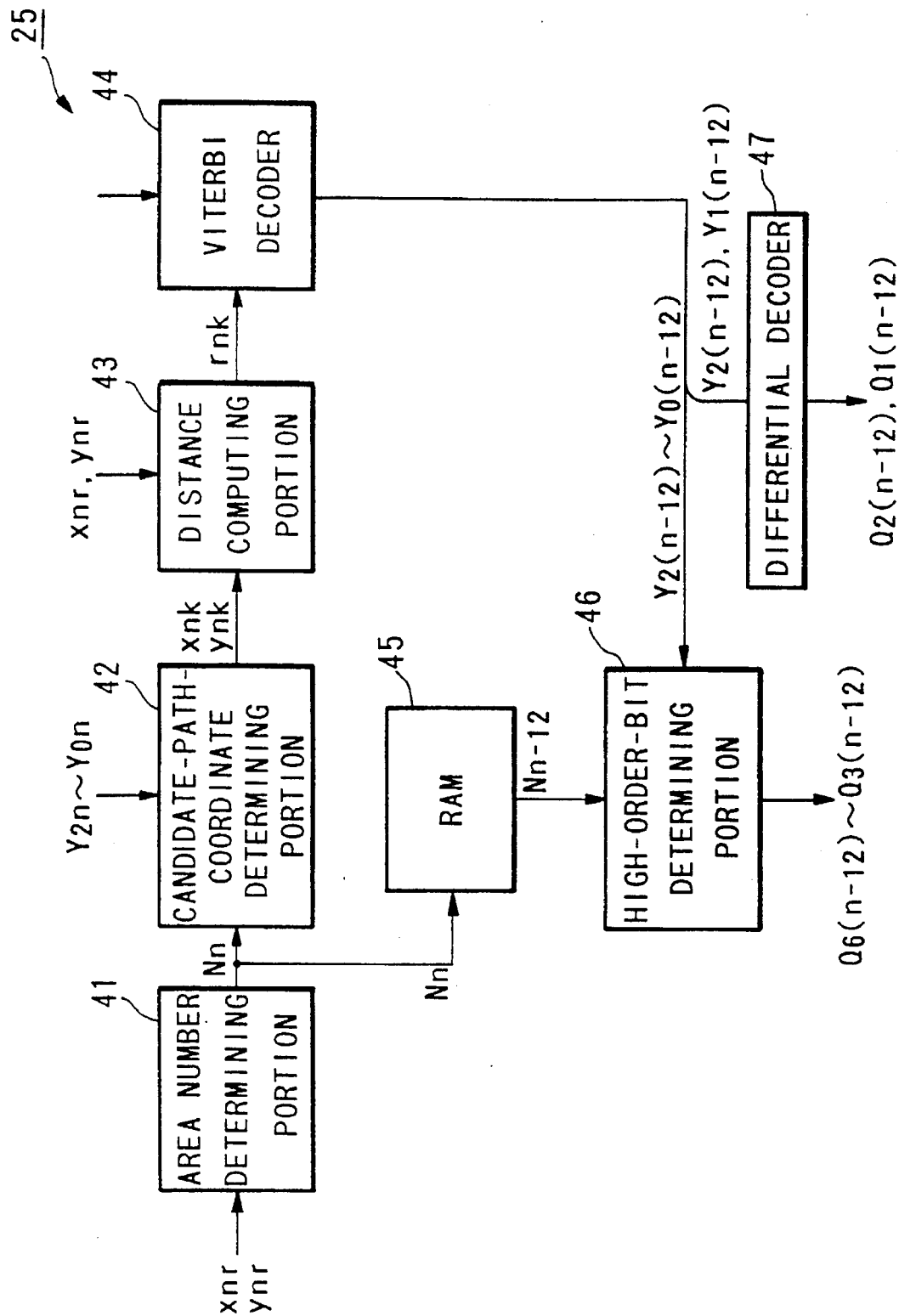
FIG. 4 is a block diagram showing a detailed configuration of the decoder according to an embodiment of the present invention.

FIG. 4 is a block diagram showing a detailed configuration of the decoder 25.

Figure 5:
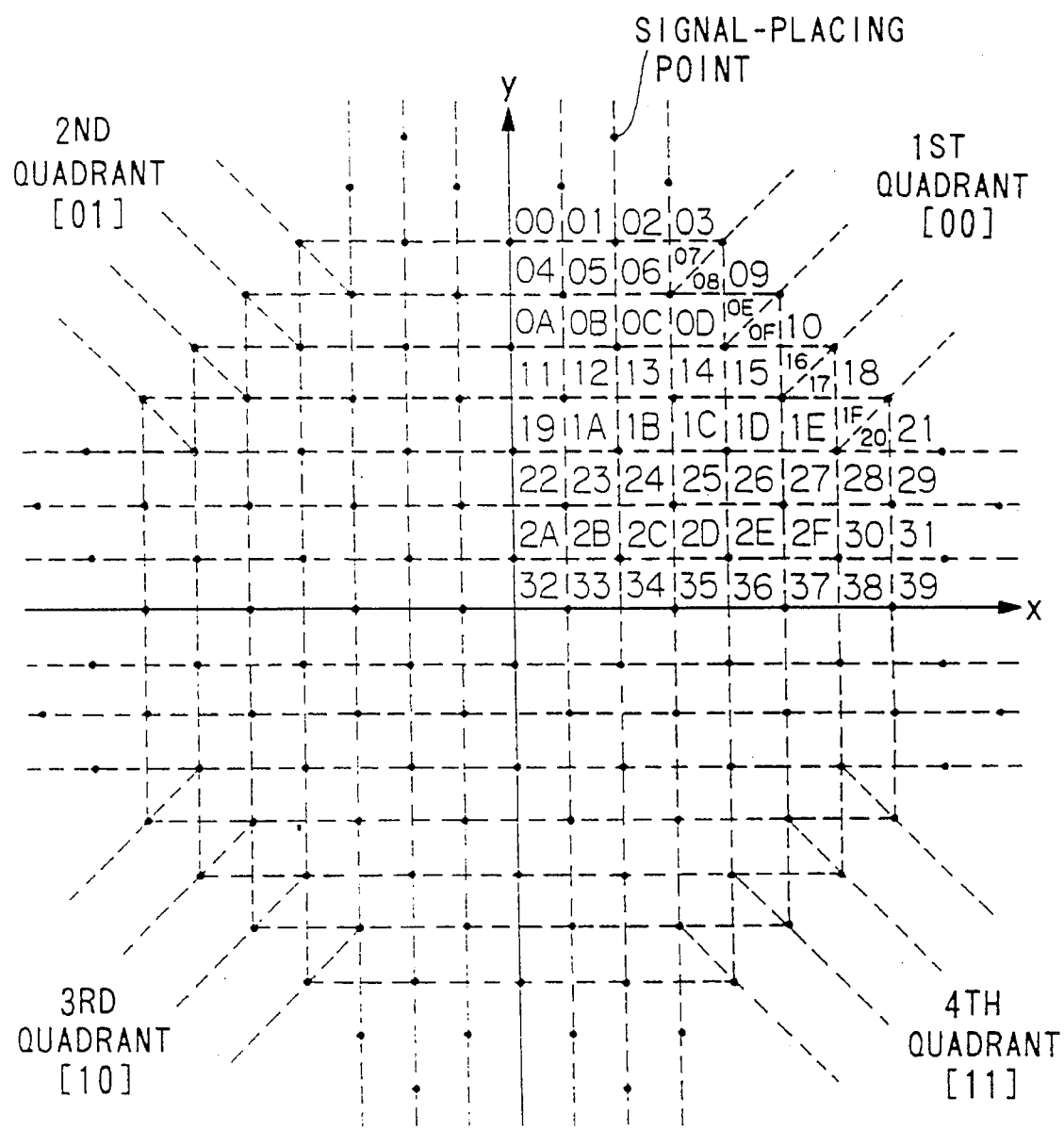
FIG. 5 is a drawing showing an amplitude-phase plane whose whole area is divided to determine a specific area to which a receiving point may belong.

At first, an area number determining portion 41 determines which area in the amplitude-phase plane the receiving point indicated by the coordinates Xnr and Ynr belongs to. Then, the area number determining portion 41 produces an area number Nn representing the area to which the receiving point belongs. The whole area of the amplitude-phase plane is divided into rectangular areas (i.e., sub-quadrant areas) each having a pitch which is smaller than a pitch between two signal-placing points as shown in FIG. 5. In an example shown in FIG. 5, the amplitude-phase plane is divided by horizontal lines and vertical lines each of which passes through the signal-placing points. Herein, each horizontal line extends in a direction of X axis, while each vertical 1 line extends in a direction of Y axis. Further, each of four-corner areas in the amplitude-phase plane is divided by slanted lines. A certain area number Nn is assigned to each of the divided areas. Each of four quadrant areas is indicated by predetermined two bits, i.e., "00", "01", "10" and "11". The number of the divided areas included in each quadrant area is set at "58". Therefore, each of the fifty-eight divided areas included in each quadrant area can be indicated by 6-bit data. In other words, all of the divided areas included in all of the four quadrant areas can be indicated by 8-bit data. Thus, the area number Nn is represented by the 8-bit data.

Figure 6:
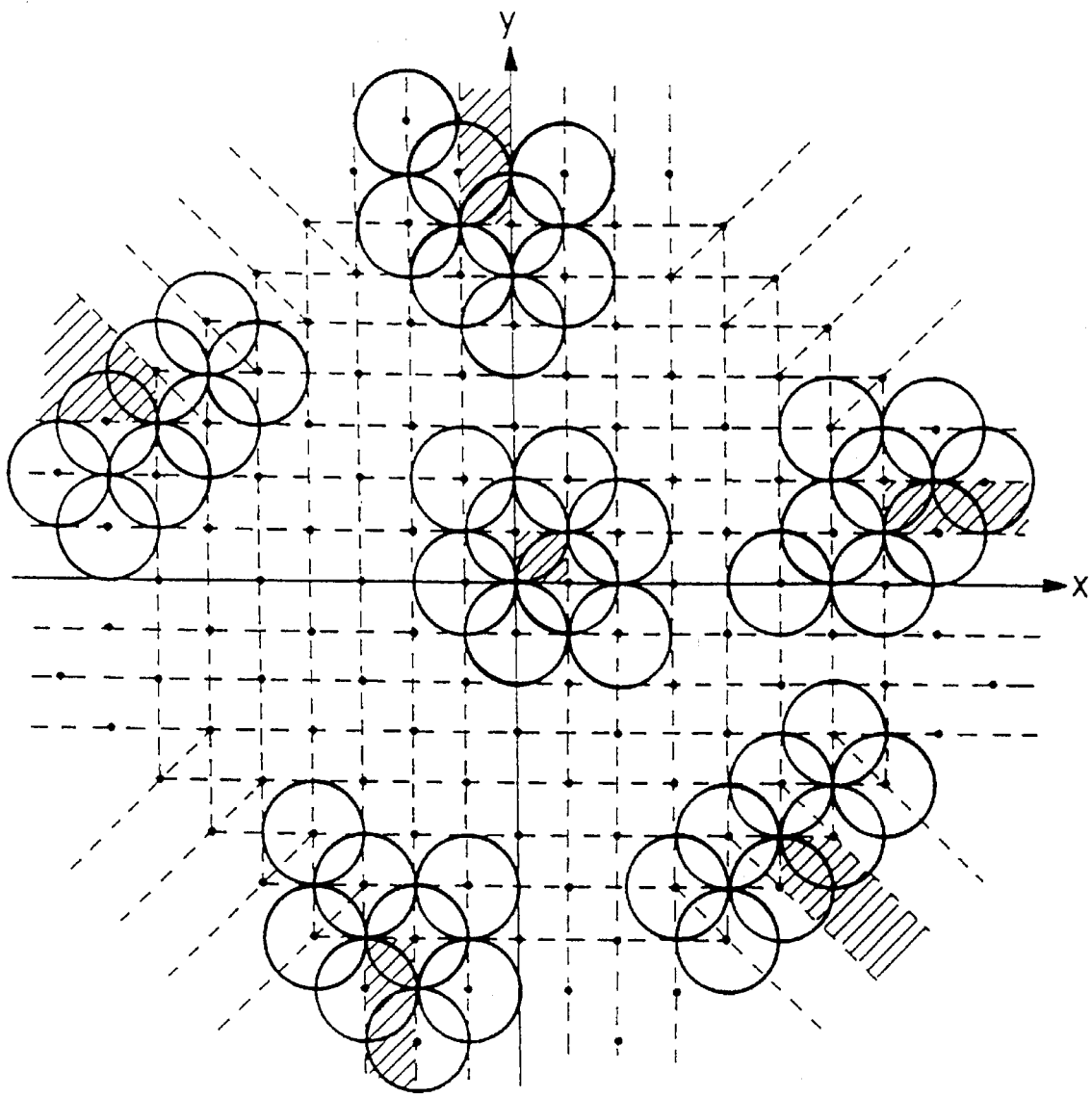
FIGS. 6 and 7 show examples of methods of searching candidate paths with respect to receiving points.
Figure 7:
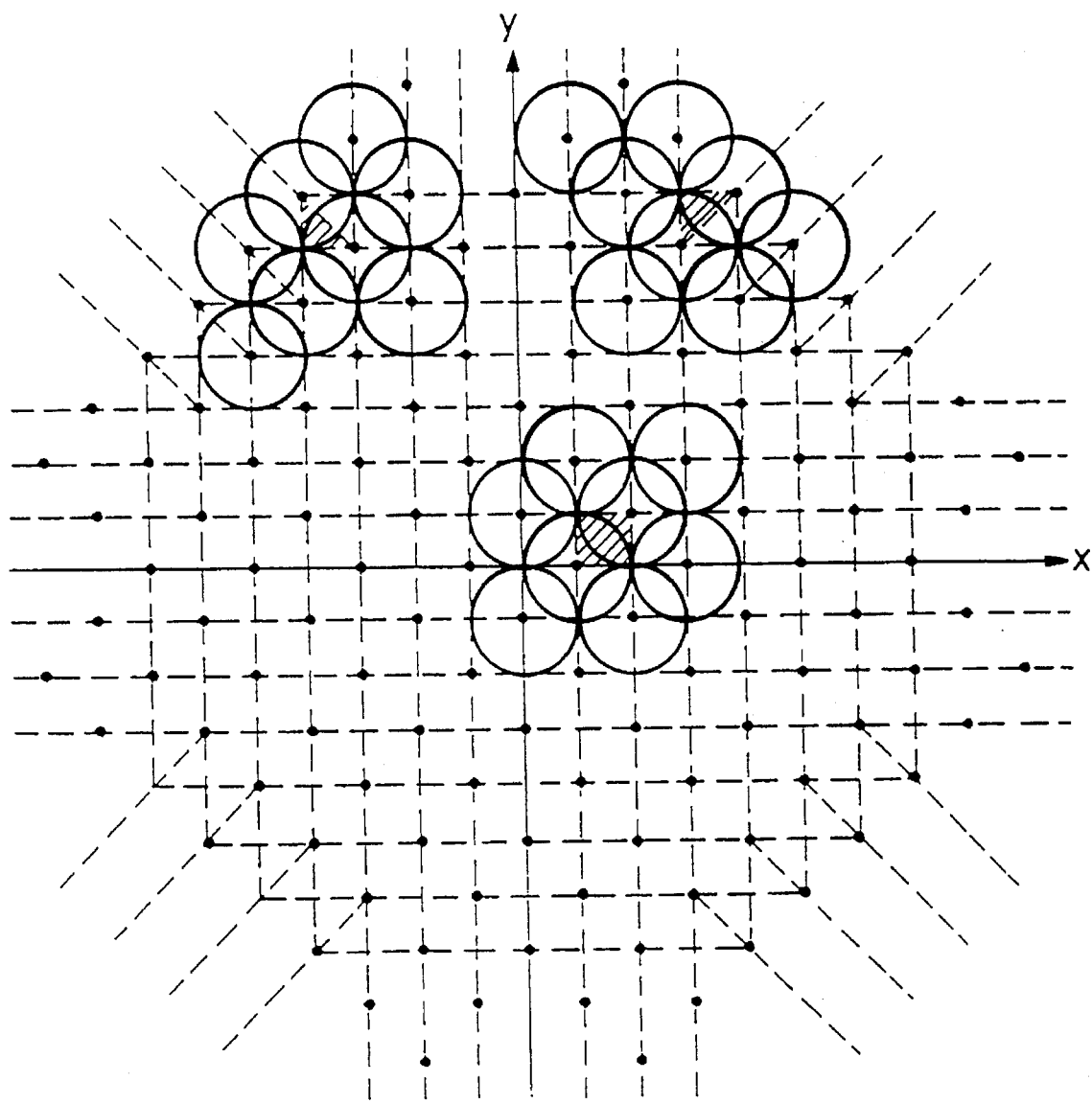

The area number Nn outputted from the area number determining portion 41 is supplied to a candidate-path-coordinate determining portion 42. The candidate-path-coordinate determining portion 42 selects eight signal-placing points which are arranged around the divided area designated by the area number Nn; and then, eight pairs of coordinates corresponding to those eight signal-placing points are determined. The eight signal-placing points are selected as the eight candidate paths. In accordance with predetermined rules as shown in FIGS. 6 and 7, a predetermined relationship is established between each area number and its corresponding eight candidate paths with respect to each area. In FIGS. 6 and 7, a portion or an area with slanted lines represents a portion or an area which includes the receiving point. Each point surrounded by a circle corresponds to each of the eight candidate paths. As shown in FIG. 14, each of the eight candidate paths (i.e., eight signal-placing points) is related to the 7-bit data. The candidate-path-coordinate determining portion 42 determines the eight candidate paths such that each of those eight paths corresponds to each of eight 7-bit data, the low-order three bits (i.e., Y2n to Y0n) of which are respectively represented by (0,0,0), (0,0,1), . . . , (1,1,1). Thus, the candidate-path-coordinate determining portion 42 determines coordinates Xnk and Ynk for each candidate path on the basis of the area number Nn and the low-order three bits Y2n to Y0n which are given from a counter and the like (not shown). Those coordinates are sequentially outputted with respect to the eight candidate paths.

The eight pairs of the coordinates Xnk and Ynk produced by the candidate-path-coordinate determining portion 42 are sequentially supplied to a distance computing portion 43. The distance computing portion 43 computes a distance "rnk" between the receiving point, represented by the coordinates Xnr and Ynr, and a point represented by the coordinates Xnk and Ynk (where a value k is changed as 0, 1, . . . , 7 in response to each of the eight candidate paths) on the basis of a certain equation, expressed as follows:

$$rnk = \sqrt{\{(Xnr - Xnk)^2 + (Ynr - Ynk)^2\}}$$

Then, the distance rnk computed by the distance computing portion 43 is supplied to a viterbi decoder 44. The viterbi decoder 44 searches the shortest path to determine the surviving path in accordance with viterbi decoding algorithms.

In FIG. 8, four receiving points corresponding to four sampling moments T1, T2, T3 and T4 are indicated by marks "o" numbered with ①, ②, ③ and ④ respectively. Herein, an area with slanted lines, which contains the receiving point, represents the area which is detected responsive to each sampling moment. Eight signal-placing points, which are arranged around the area with the slanted lines and are surrounded by a dotted line, correspond to the eight candidate paths. Then, the distance is computed between the receiving point, included in the area designated by the area number Nn, and each signal-placing point corresponding to each candidate path in accordance with rules as shown in FIG. 9.

Figure 10:
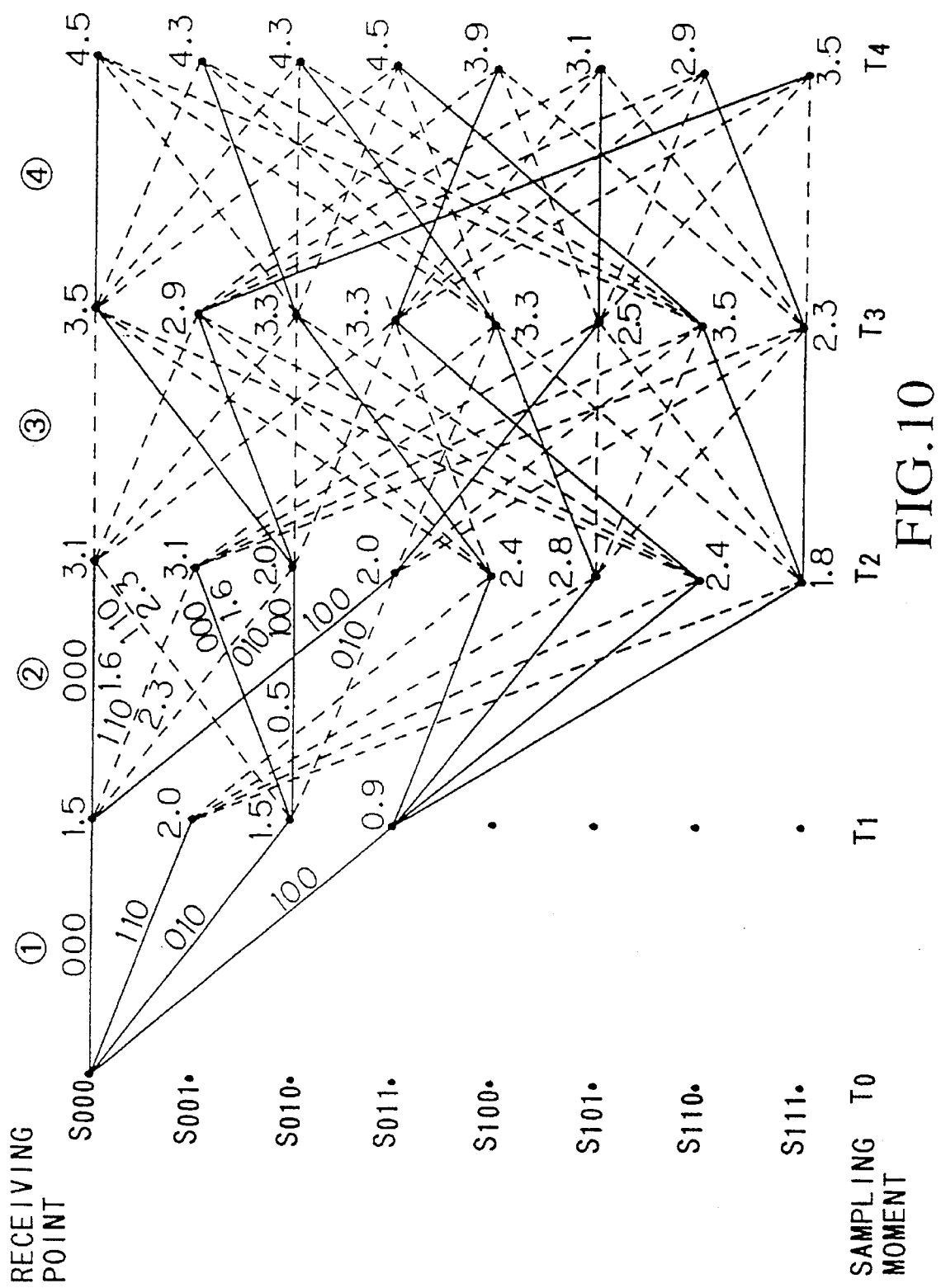
FIG. 10 shows a method of determining a surviving path among the candidate paths.

Now, if the trellis encoder 11 is set in a state "S000" at a sampling moment T0, a searching route is determined as shown in FIG. 10 in accordance with the state transition rule shown in FIG. 13. In order to lead the searching route from the state S000 of the sampling moment T0 to a state S000 of the sampling moment T2, there are provided two routes, i.e., a first route represented by S000→S000→S000 and a second route represented by S000→S010→S000. In the first route containing first and second candidate paths, three bits of the receiving data are set at "000" which is written above the first candidate path between the state S000 of sampling moment T0 and the state S000 of sampling moment T1; and those three bits are also set at "000" which is written above the second candidate path between the state S000 of sampling moment T1 and the state S000 of sampling moment T2. In the second route containing third and fourth candidate paths, the three bits of the receiving data are set at "010" which is written above the third candidate path between the state S000 of sampling moment T0 and the state S010 of sampling moment T1; and those three bits are set at "110" which is written above the fourth candidate path between the state S010 of sampling moment T1 and the state S000 of sampling moment T2. The first candidate path has a distance (or length) of 1.5, while the second candidate path has a distance of 1.6, so that the first route has a total distance of 3.1. On the other hand, the third candidate path has a distance of 1.5, while the fourth candidate path has a distance of 2.3, so that the second route has a total distance of 3.8. Thus, the shorter route (i.e., first route) represented by S000→S000→S000 is determined as the surviving path. In FIG. 10, each of the surviving paths is indicated by a continuous line, while the other paths which are not selected as the surviving paths are indicated by a dotted line.

In a manner as described above, the shorter one between two routes can be selected as the surviving path which connects the state S000 of sampling moment T0 to each of states S000, S001, . . . , S111 of the sampling moment T2. In FIG. 10, eight surviving paths can be obtained with respect to the states S000, S001, . . . , S111 of the sampling moment T2. The total distances of those eight surviving paths are respectively calculated to 3.1, 3.1, 2.0, 2.0, 2.4, 2.8, 2.4 and 1.8.

Next, the path searching operations as described above are carried out with respect to routes from the state S000 of sampling moment T0 to the states S000, S001, . . . , S111 of the sampling moment T3. Herein, eight surviving paths, which connect the state S000 of sampling moment T0 to the eight states S000, S001, . . . , S111 of the sampling moment T3, can be selected by referring to the aforementioned eight surviving paths, which respectively connect the state S000 of sampling moment T0 to the eight states of the sampling moment T2, and other paths each of which can connect the state S000 of sampling moment T0 to each of the eight states of the sampling moment T3. The above-mentioned eight surviving paths have the small total distances which are smaller than the total distances of all other paths which connect the state S000 of sampling moment T0 to each of the eight states of the sampling moment T3. In FIG. 10, the total distances of those eight surviving paths are set at 3.5, 2.9, 3.3, 3.3, 3.3, 2.5, 3.5 and 2.3 respectively.

Similarly, the path searching operations are continuously carried out from the sampling moment T4 to the sampling moment T12. Thus, it is possible to obtain eight surviving paths which connect the state S000 of sampling moment T0 to eight states S000 to S111 of the sampling moment T12. Thereafter, one of them which has the smallest total distance is finally selected.

When one surviving path is finally defined at the sampling moment T12, the low-order three bits Y2(n-12), Y1(n-12) and Y0(n-12) of the decoded data at the sampling moment T0 can be determined.

In FIG. 4, the aforementioned area number Nn outputted from the area number determining portion 41 is delivered to a random-access memory (i.e., RAM) 45. The area number Nn is once stored in the RAM 45; thereafter, the area number Nn is outputted from the RAM 45 at a timing which is the twelve sampling moments after the current sampling moment. This area number outputted from the RAM 45 is denoted by "Nn-12". The area number Nn-12 is supplied to a high-order-bit determining portion 46. On the basis of the area number Nn-12 and the low-order three bits Y2(n-12) to Y0(n-12) of the decoded data which are determined by the viterbi decoder 44, the high-order-bit determining portion 46 determines high-order four bits Q6(n-12) to Q6(n-12) for the decoded data. On the other hand, the bits Y2(n-12) and Y1(n-12) outputted from the viterbi decoder 44 are supplied t6 a differential decoder 47, in which bits Q2(n-12) and Q1(n-12) are produced.

Thus, an error correction process is completely performed on the sending data consisting of the bits Q6(n-12) to Q1(n-12).

In the example described before, the path searching operation is started from the state S000 of sampling moment T0. This is merely an example in which one specific state is determined for a first sampling moment when starting the data communication. Therefore, in the continuing data communication, such one specific state is not determined at the previous sampling moment which is one sampling moment before the current sampling moment.

Figure 11:
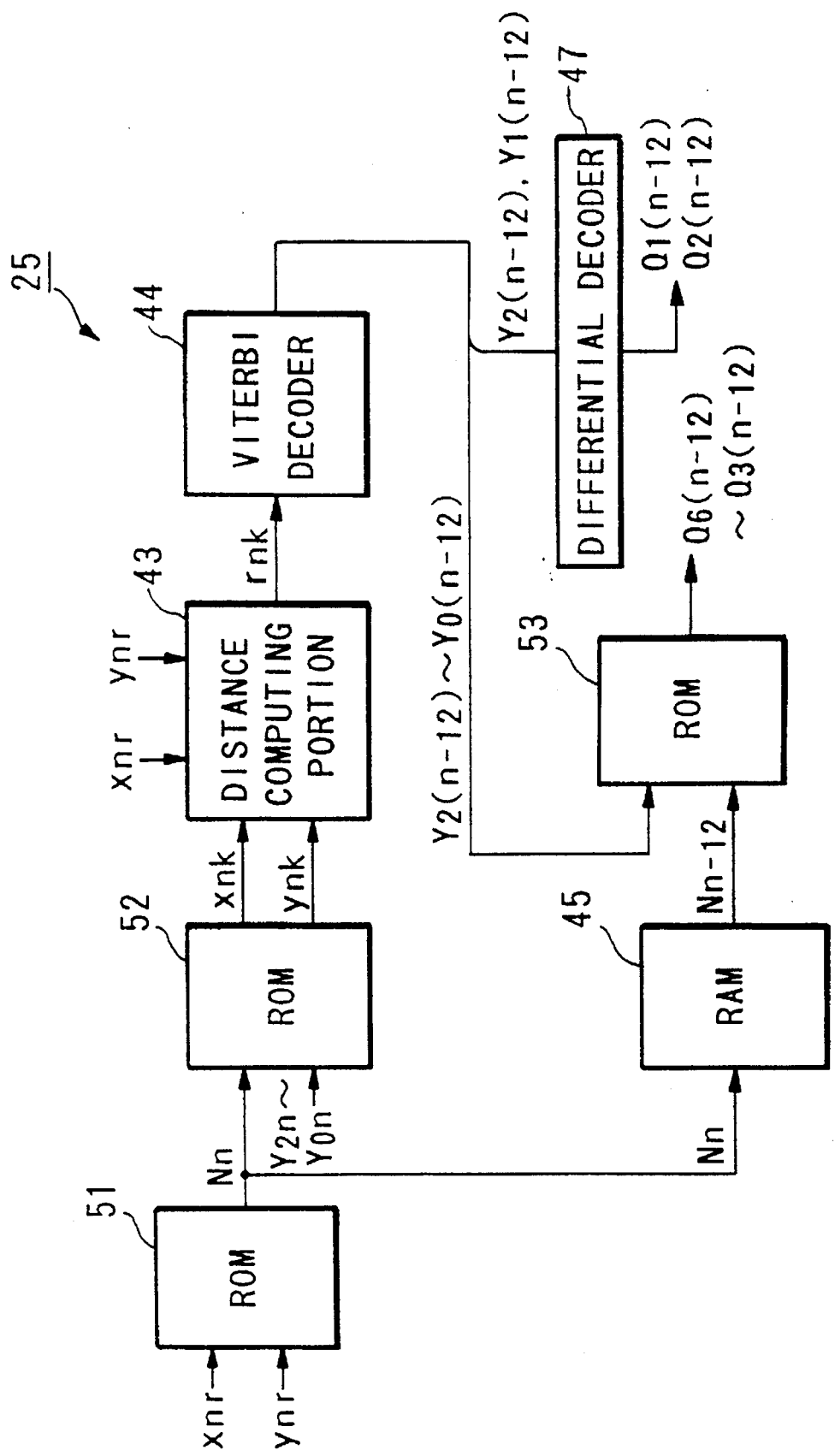
FIG. 11 is a block diagram showing a real circuit configuration of the decoder.

FIG. 11 shows a real circuit configuration of the decoder 25 shown in FIG. 2. The parts identical to those shown in FIG. 4 are designated by the same numerals in FIG. 11. In FIG. 11, the area number determining portion 41 shown in FIG. 4 is configured by a read-only memory(1.e., ROM) 51. The coordinates Xnr and Ynr for the receiving point are supplied to the ROM S1 as its addresses. Thus, by using those addresses, the area number Nn is read out from the ROM 51. The aforementioned candidate-path-coordinate determining portion 42 shown in FIG. 4 is configured by a ROM 52 in FIG. 1 . The ROM 52 receives the area number Nn and the three bits Y2n to Y0n which are produced from a counter (not shown) as addresses thereof. Those addresses are used to specify one signal-placing point, whose coordinates Xnk and Ynk are outputted from the ROM 52. As the high-order-bit determining portion 46, a ROM 53 is employed in FIG. 11. The ROM 53 receives the area number Nn-12, outputted from the RAM 45, and the low-order three bits Y2(n-12) to Y0(n-12) of the decoded data as addresses thereof. By using those addresses, the high-order four bits of the decoded data are read out from the ROM 53.

By use of the decoder 45 as described above, it is possible to reduce the number of times, by which the area comparison should be carried out, to one. Thus, the area-comparison/judgement process can be simplified. In addition, the RAM 45 can merely store a relatively small amount of data corresponding to "8(bits)×12(stages)". Therefore, as compared to the conventional system, it is possible to employ a relatively small storage device for the RAM 45.

Figures 12A, 12B:
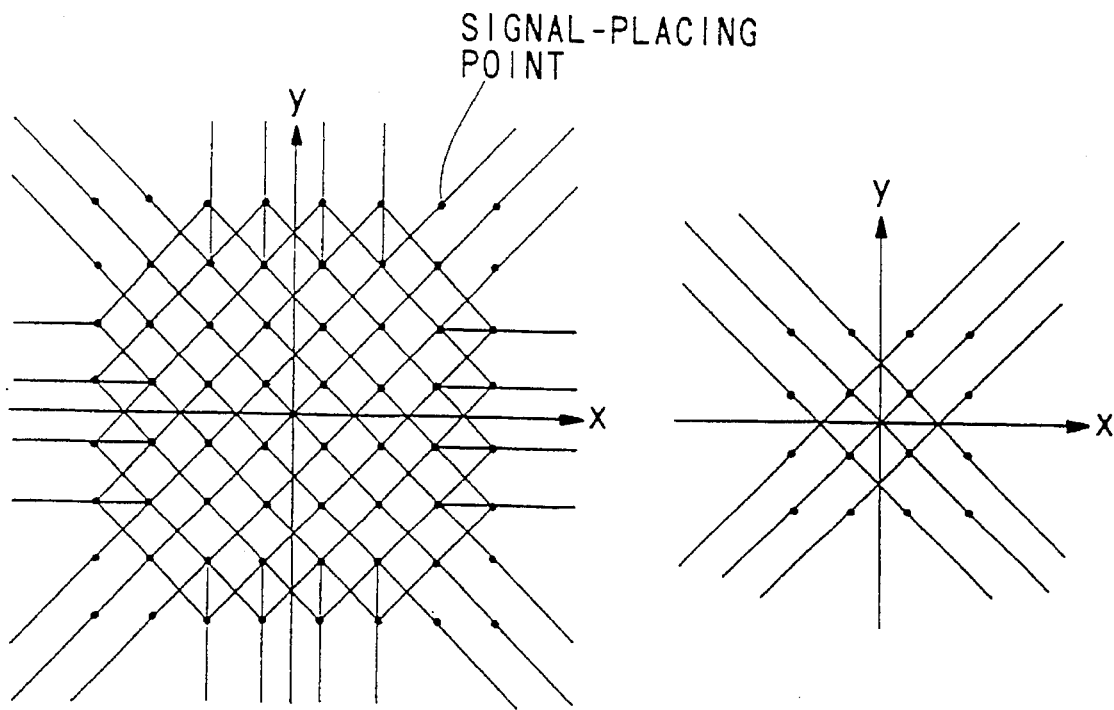
FIGS. 12(A) to 12(C) show other methods of dividing the whole area of the amplitude-phase plane.
Figure 12C:
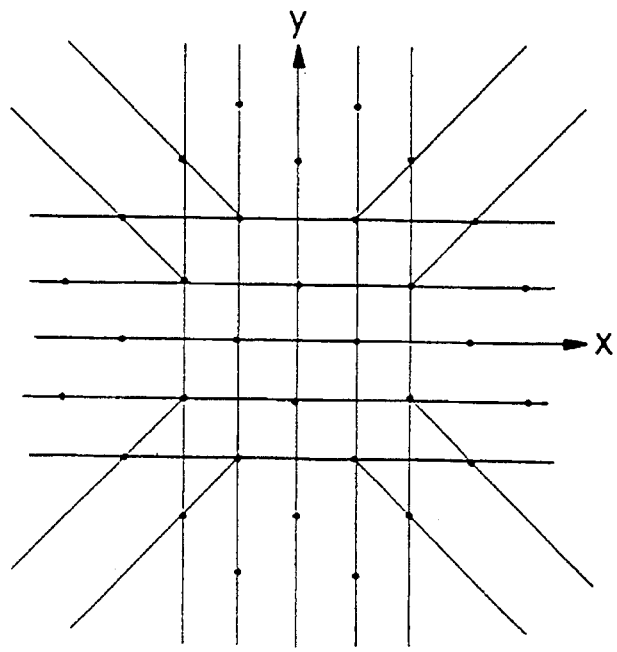

Incidentally, the method of dividing the whole area of the amplitude-phase plane is not limited to that employed by the present embodiment. Hence, that method can be modified as shown in FIGS. 12(A) to 12(C) in response to a manner of arranging the signal-placing points.

Lastly, this invention may be practiced or embodied in still other ways without departing from the spirit or essential character thereof as described heretofore. Therefore, the preferred embodiment described herein is illustrative and not restrictive, the scope of the invention being indicated by the appended claims and all variations which come within the meaning of the claims are intended to be embraced therein.

What is claimed is:

1. A decoding system, which decodes data encoded in a viterbi manner an which changes a state of encoded data in accordance with a predetermined state transition rule, the system comprising:

encoding means for encoding data to be transmitted thereto;

transmitting means for transmitting the encoded data;

receiving means for receiving the encoded data as received data indicative of a present point and for generating an X coordinate and a Y coordinate;

area determining means for determining an area code indicative of a quadrant area and a sub-quadrant area, to which the encoded data received by the receiving means belongs, based on the X an Y coordinates, each quadrant and sub-quadrant includes a plurality of signal points on a signal space diagram, and the quadrant and sub-quadrant areas being defined by using predetermined lines which pass through signal points indicative of the encoded data, and wherein the sub-quadrant area has a pitch representing a distance on the signal space diagram that is smaller than the pitch between two of the plurality of signal points;

path determining means for determining paths for the receiving data, the paths leading from the present point indicated by the received data to one of a plurality of candidate signal points disposed adjacent to an area defined by the received data, based on the area code; and decoding means for decoding the received data using viterbi decoding.

2. A decoding system according to claim 1, wherein the transmitting means further includes modulating means for modulating the encoded data.

3. A decoding system according to claim 1, wherein the receiving means further includes demodulating means for demodulating the received data.

4. A decoding system according to claim 1, wherein the encoding means includes a trellis encoder which adds redundant information to data transmitted thereto by performing a convolution calculation.

5. A decoding system according to claim 1, wherein the area determining means includes a table which stores information representing the signal space diagram having the signal points.

6. A decoding system according to claim 1, further including:

distance computing means for computing a plurality of distances between the present point and the signal points corresponding to the paths for each sampling moment;

wherein the decoding means performs viterbi decoding on each of the paths by use of the plurality of distances computed by the distance computing means so as to determine a surviving path whose total distance is the smallest over a predetermined number of sampling moments, the decoding means also determining viterbi low-order bits for decoded data of a previous receiving point that is the predetermined number of sampling moments before a current sampling moment;

wherein the system also includes:

storage means for retaining the area code during the predetermined number of sampling moments, so that the storage means eventually outputs a previous area code that was produced from the area determining means at the previous timing; and high-order bit determining means for determining high-order bits for the decoded data on the basis of the previous area code from the storage means and the viterbi low-order bits determined by the decoding means corresponding to the previous receiving point, the high-order bits being determined in response to a combination of the signal points which is determined in advance in accordance with a convolution-encoding operation with respect to each area to which the present point belongs, such that the decoded data is formed by the high-order bits and decoded low-order bits based upon the viterbi low-order bits from the decoding means.

7. A decoding device as defined in claim 6, further including a differential decoder portion which produces the decoded low-order bits from the viterbi low-order bits determined by the decoding means, wherein a number of the decoded low-order bits is smaller than that of the viterbi low-order bits determined by the decoding means.

8. A decoding device as defined in claim 6, wherein the storage means is a random-access memory.

9. A decoding system, which decodes data encoded in a viterbi manner and which changes a state of encoded data in accordance with a predetermined state transition rule, the system comprising:

an encoder that encodes data to be transmitted;

a transmitter that transmits the encoded data;

a receiver that receives the encoded data as received data indicative of a present point and that generates an X coordinate and a Y coordinate;

an area determining circuit that determines an area code indicative of a quadrant area and a sub-quadrant area, to which the encoded data received by the receiver belongs, based on the X an Y coordinates, each quadrant and sub-quadrant includes a plurality of signal points on a signal space diagram, and the quadrant and sub-quadrant areas being defined by using predetermined lines which pass through signal points indicative of the encoded data, and wherein the sub-quadrant area has a pitch representing a distance on the signal space diagram that is smaller than the pitch, between two of the plurality of signal points;

a path determining circuit that determines paths for the receiving data, the paths leading from the present point indicated by the received data to one of a plurality of candidate signal points disposed adjacent to an area defined by the received data, based on the area code; and a decoder that decodes the received data using viterbi decoding.

10. A decoding system according to claim 9, wherein the transmitter further includes a modulating circuit that modulates the encoded data.

11. A decoding system according to claim 9, wherein the receiver further includes a demodulating circuit that demodulates the received data.

12. A decoding system according to claim 9, wherein the encoder includes a trellis encoder which adds redundant information to data transmitted thereto by performing a convolution calculation.

13. A decoding system according to claim 9, wherein the area determining circuit includes a table which stores information representing the signal space diagram having the signal points.

14. A decoding system according to claim 9, further including:

a distance computing circuit that computes a plurality of distances between the present point and the signal points corresponding to the paths for each sampling moment;

wherein the decoder performs viterbi decoding on each of the paths by use of the plurality of distances computed by the distance computing means so as to determine a surviving path whose total distance is the smallest over a predetermined number of sampling moments, the decoder also determines viterbi low-order bits for decoded data of a previous receiving point that is the predetermined number of sampling moments before a current sampling moment;

wherein the system also includes:

a storage device that retains the area code during the predetermined number of sampling moments, so that the storage device eventually outputs a previous area code that was produced from the area determining circuit at the previous timing; and a high-order bit determining circuit that determines high-order bits for the decoded data on the basis of the previous area code from the storage device and the viterbi low-order bits determined by the decoder corresponding to the previous receiving point, the high-order bits being determined in response to a combination of the signal points which is determined in advance in accordance with a convolution-encoding operation with respect to each area to which the present point belongs, such that the decoded data is formed by the high-order bits and decoded low-order bits based upon the viterbi low-order bits from the decoder.

15. A decoding device as defined in claim 14, further including a differential decoder portion which produces the decoded low-order bits from the viterbi low-order bits determined by the decoder, wherein a number of the decoded low-order bits is smaller than that of the viterbi low-order bits determined by the decoder.

16. A decoding device as defined in claim 14, wherein the storage device is a random-access memory.

* * * * *

UNITED STATES PATENT AND TRADEMARK OFFICE
CERTIFICATE OF CORRECTION

PATENT NO. : 5,568,517
DATED : October 22, 1996
INVENTOR(S) : AKIRA SOGO; RYO KAMIYA It is certified that error appears in the above-indentified patent and that said Letters Patent is hereby corrected as shown below:

On the front page, Col. 1, in the [54] the second word in the title "DEVICE" is incorrect. The correct word is --SYSTEM--.

Signed and Sealed this

Twenty-fifth Day of February, 1997

Attest:

BRUCE LEHMAN

*Attesting Officer*     *Commissioner of Patents and Trademarks*